US000001979H

(19) United States

(12) Statutory Invention Registration (10) Reg. No.: US H1979 H

Hopkins (43) Published: Aug. 7, 2001

(54) ELECTRONIC STREAK CAMERA

(75) Inventor: Mark F. Hopkins, Winter Park, FL (US)

(73) Assignee: The United States of America as represented by the Secretary of the Air Force, Washington, DC (US)

(21) Appl. No.: 09/148,910

(22) Filed: Aug. 31, 1998

(51) Int. Cl.[7] ..... H01J 40/14; H01J 3/14; H01J 40/18; G01J 3/28; G01J 3/18

(52) U.S. Cl. ..... 250/214 VT; 250/216; 356/328; 356/334; 313/529; 313/537

(58) Field of Search ..... 250/214 VT, 216; 356/328, 334; 313/529, 537

(56) References Cited

U.S. PATENT DOCUMENTS

| | | | | |
|---|---|---|---|---|
| 4,769,552 | | 9/1988 | Boue et al. | 348/317 |
| 5,101,100 | | 3/1992 | Kinoshita et al. | 250/214 VT |
| 5,144,374 | | 9/1992 | Grego | 356/326 |
| 5,221,836 | | 6/1993 | Kinoshita | 250/214 VT |
| 5,278,403 | | 1/1994 | Alfano et al. | 250/214 VT |
| 5,394,237 | * | 2/1995 | Chang et al. | 356/328 |
| 5,424,827 | * | 6/1995 | Horwitz et al. | 356/328 |
| 5,504,575 | * | 4/1996 | Stafford | 356/330 |
| 5,636,050 | * | 6/1997 | Alfano et al. | 359/238 |

* cited by examiner

*Primary Examiner*—Michael J. Carone
*Assistant Examiner*—Aileen J. Baker
(74) *Attorney, Agent, or Firm*—Bobby D. Scearce; Thomas L. Kundert

(57) ABSTRACT

An electronic streak camera is described which includes a housing enclosing an objective lens disposed along an optical axis for forming an image of optical radiation from an emissive body, a pinhole field stop at the focal point of the objective lens, a collimating lens for collimating radiation passing the pinhole field stop, a prism for splitting the radiation from the collimating lens into a characteristic optical spectrum of the radiation, an imaging lens for forming an image of the radiation from the prism.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

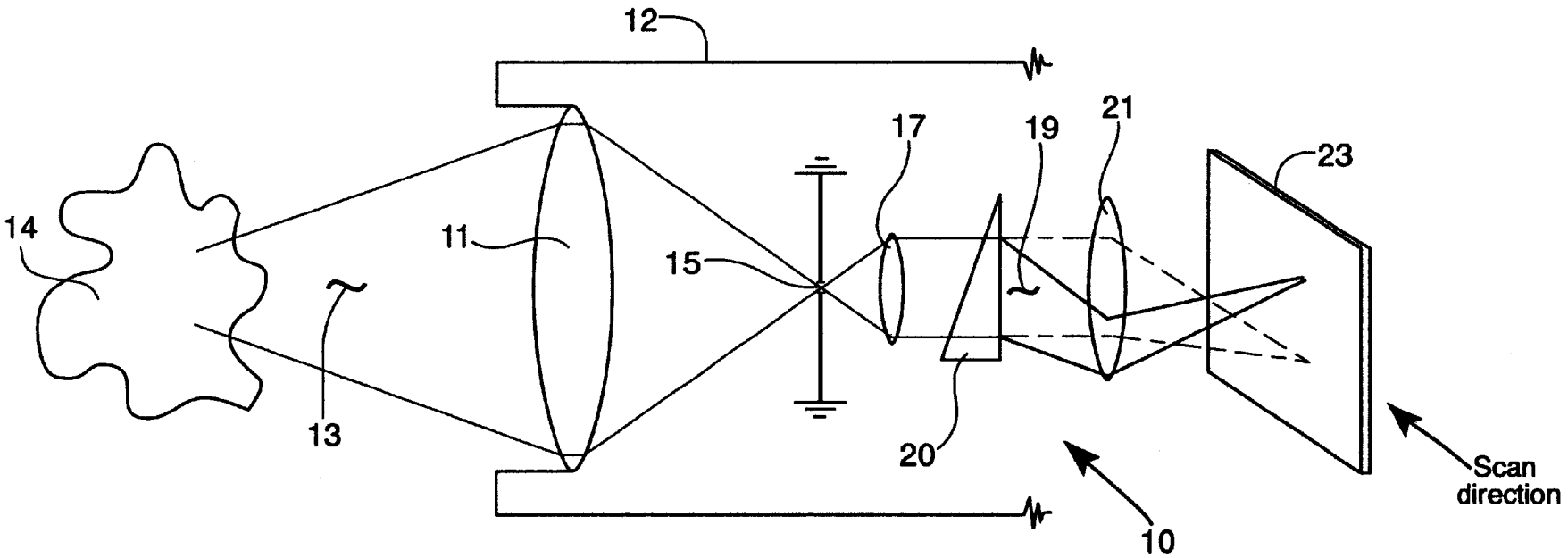
Scan direction
23
21
19
17
15
12
11
13
14
10
20

ELECTRONIC STREAK CAMERA

RIGHTS OF THE GOVERNMENT

The invention described herein may be manufactured and used by or for the Government of the United States for all governmental purposes without the payment of any royalty.

BACKGROUND OF THE INVENTION

The present invention relates generally to electronic streak camera structures, and more particularly to an electronic streak camera structure having no moving parts for accurate imaging of high speed transient events.

Conventional streak camera systems for measuring temperature of energetic environments have been substantially dominated by system noise, the primary effect of which is that energy gathered for in each measured wavelength is somewhat higher or lower than true readings. In a conventional streak camera, a mirror is rotated in the pupil of the optical system to separate time events onto a fixed focal plane. A prism or diffraction grating is typically used to disperse the optical energy onto a detector. Mechanical jitter of the rotating mirror inherently introduces error into the measurements. Additionally, conventional streak cameras are light-inefficient and are typically ten stops lower than a standard electronic camera, reducing the amount of light collected by a factor of 100 or more. To amplify the light, photomultiplier tubes or multi-channel plates are used, which introduce substantial additional noise. Only general radiative characteristics can be obtained with these systems because of the limited signal-to-noise performance.

The invention solves or substantially reduces in critical importance problems with conventional streak camera structures by providing a streak camera including a spectrometer having no moving parts for use in recording high speed transient events. The camera of the invention is characterized by low noise and low cost of operation, provides improved light efficiency (two orders of magnitude) and greater light collecting capability (f/2 vs f/20) compared to conventional streak camera structures, and permits temperature determinations accurately for highly dynamic test events such as internal combustion in engines, materials deformation in hot metal processing and detonating or deflagrating explosives, including measurements at very high rates of temperature change (hundreds of degrees per millisecond).

For the purpose of describing the invention and defining the scope thereof, the term "optical" shall, in accord with customary usage, be defined herein to include only ultraviolet, visible, near infrared, mid-infrared and far infrared regions of the electromagnetic spectrum lying between about 0.1 to about 1000 microns (see, e.g., *Optical Physics*, Max Garbuny, Academic Press, NY, 1965, pp 1–6), and more specifically to the range of from about 0.2 micron, the approximate lower limit of operation of fine quality quartz lenses (Garbuny, p 280), to about 50 microns, the approximate upper limit of operation of long wavelength transmitting material such as thallium bromide-iodide ionic crystal (Garbuny, p 282).

It is therefore a principal object of the invention to provide an electronic streak camera.

It is another object of the invention to provide an electronic streak camera for use in high-speed pyrometry of energetic materials.

It is a further object of the invention to provide an electronic streak camera having no moving parts.

It is a further object of the invention to provide an electronic streak camera for acquiring temperature data on explosive materials.

It is yet another object of the invention to provide an electronic streak camera for acquiring temperature data at high rates of temperature change.

These and other objects of the invention will become apparent as a detailed description of representative embodiments proceeds.

SUMMARY OF THE INVENTION

In accordance with foregoing principles and object of the invention, an electronic streak camera is described which includes a housing enclosing an objective lens disposed along an optical axis for forming an image of optical radiation from an emissive body, a pinhole field stop at the focal point of the objective lens, a collimating lens for collimating radiation passing the pinhole field stop, a prism for splitting the radiation from the collimating lens into a characteristic optical spectrum of the radiation, an imaging lens for forming an image of the radiation from the prism.

DESCRIPTION OF THE DRAWING

The invention will be more clearly understood from the following detailed description of representative embodiments thereof read in conjunction with the accompanying schematic drawing illustrating a representative electronic streak camera structure according to the invention.

DETAILED DESCRIPTION

Referring now to the drawing, shown therein is a schematic illustration of a representative electronic streak camera 10 structure of the invention. Objective lens 11 is disposed within an opening in a wall of housing 12, lens 11 being selected in size and focal length for forming an image of radiation 13 passing along optical axis O from an emissive body 14 onto pinhole field stop 15 disposed within housing 12 substantially as shown in the drawing. Radiation passing through pinhole 15 is collimated by lens 17 and split into its characteristic spectrum 19 by prism 20. Lens 21 then images spectrum 19 onto detector array 23 disposed at the focal plane of lens 21. Housing 10 may be of any suitable structure for enclosing camera 10 constituent elements. Detector array 23 may comprise any suitable detector system such as a CCD array or other charge transfer detector system, the same not considered limiting of the invention. Scanning is achieved by clocking the line image of the array to the adjacent row, which no optical energy from the object reaches.

Using the formula for the characteristic radiation of a material (usually a Planck distribution) total radiation from the material can be found by multiplying this formula by the surface emissivity. Multiple spectral measurements can be used to determine temperature when the radiation formula is a function of temperature and wavelength. However, using a camera to collect the spectrum has often been based on assumptions that lead to erroneous results, primarily because of the uncertainty in the collected optical energy. Emissivity, atmospheric transmission, detector non-linearity, etc. can all affect the amount of energy collected, depending on wavelength and bandwidth at which the measurement is made. The problem may be reduced to an uncertainty in emissivity (see e.g., *Methods of Optical Polychromatic Pyrometry*, V. N. Snopko, Plenum Publishing Co. (1988) pp 724–729). Emissivity can be characterized with an $M^{th}$ degree polynomial in wavelength by $$\epsilon_{eff}(\lambda)=a_{M+1}\lambda^{M}+a_{M}\lambda^{M-1}+a_{M-1}\lambda^{M-2}+\ldots+a_{1} \tag{1}$$

where the constants describe emissivity behavior. If, for example, a material has an emissivity that does not change with wavelength (graybody), only $a_1$ need be determined because all other constants are zero. Consequently, only two spectral measurements are necessary to form two equations for the two unknowns ($a_1$ and temperature T). If an $M^{th}$ degree polynomial provides an accurate fit to a given material emissivity profile, there will be M coefficients, $a_{M+1}$ . . . $a_2$, of wavelength that will be unknown. With $a_1$ and T unknown, a minimum of M+2 spectral measurements are required.

Equations constructed from the multispectral regions of the pyrometer data are:

$$\Phi_i = \int_{\lambda_{i_{min}}}^{\lambda_{i_{max}}} \frac{c_1}{\lambda^5\left(e^{\frac{c_2}{\lambda T}}-1\right)} \varepsilon(\lambda)\tau_a(\lambda)\tau_o(\lambda)R_d(\lambda)A_o\Omega d\lambda \quad \text{for } i=1 \text{ to } n, \tag{2}$$

where n is the number of spectral regions, c the velocity of light, h is Planck's constant, k the Boltzmann constant, $\tau_a(\lambda)$ the transmission of the atmosphere, $\tau_o(\lambda)$ the transmission of the optics, $R_d(\lambda)$ the responsivity of the detector and $A_0$ the area of the optics. Solving Eqs (2) will separate the coupled response of temperature and emissivity.

System parameters such as detector response and solid angle are known quantities after system calibration and can be represented as a single function $R_i(\lambda)$. Transmission terms of Eq (2) can be folded into $R_i(\lambda)$ for simplicity. The power on the detector Eq (2) can be rewritten as $$\Phi_i = \int_{\lambda_{i_{min}}}^{\lambda_{i_{max}}} \frac{c_1}{\lambda^5\left(e^{\frac{c_2}{\lambda T}}-1\right)} \varepsilon(\lambda_i)R_i(\lambda)d\lambda \quad \text{for } i=1 \text{ to } n, \tag{3}$$

The system of equations generated from the multi-spectral measurements is nonlinear because of terms associated with the Planck distribution, and a nonlinear regression optimization technique is therefore required. The equations can be made linear by holding temperature constant and obtaining a solution and an error function establishing accuracy of the predicted temperature. A regression through temperature gives the correct temperature at the minimum error function. It is important therefore to represent the emissivity as a linear function. For purposes of the linear solution technique, emissivity will be assumed to fit a second order polynomial functional form.

The linear solution technique uses Gaussian elimination to find a solution to the system of four equations constructed from four spectral measurements. With a second degree polynomial as the model for emissivity, the four equation setup by the four color pyrometer are:

$$\Phi_{\lambda_i} = \int_{\lambda_{i_{min}}}^{\lambda_{i_{max}}} \frac{c_1(a_1\lambda^2+a_2\lambda+a_3)}{\lambda^5\left(e^{\frac{c_2}{\lambda T}}-1\right)} Re_i(\lambda)d\lambda \quad \text{for } i=1 \text{ to } 4 \tag{4}$$

Rearranging terms, Eq (4) becomes $$\Phi_{\lambda_i} = a_1\int_{\lambda_{i_{min}}}^{\lambda_{i_{max}}} \frac{c_1R_i(\lambda)d\lambda}{\lambda^3\left(e^{\frac{c_2}{\lambda T}}-1\right)} + a_2\int_{\lambda_{i_{min}}}^{\lambda_{i_{max}}} \frac{c_1R_i(\lambda)d\lambda}{\lambda^4\left(e^{\frac{c_2}{\lambda T}}-1\right)} + a_3\int_{\lambda_{i_{min}}}^{\lambda_{i_{max}}} \frac{c_1R_i(\lambda)d\lambda}{\lambda^5\left(e^{\frac{c_2}{\lambda T}}-1\right)} \quad \text{for } i=1 \text{ to } 4 \tag{5}$$

At constant temperature three of the four Eqs (5) have linear solutions and can be written as, $$\Phi_{\lambda_i} = a_1\int_{\lambda_{i_{min}}}^{\lambda_{i_{max}}} \frac{c_1(T)R_i(\lambda)d\lambda}{\lambda^3} + a_2\int_{\lambda_{i_{min}}}^{\lambda_{i_{max}}} \frac{c_2(T)R_i(\lambda)d\lambda}{\lambda^4} + a_3\int_{\lambda_{i_{min}}}^{\lambda_{i_{max}}} \frac{c_3(T)R_i(\lambda)d\lambda}{\lambda^5} \quad \text{for } i=1 \text{ to } 3 \tag{6}$$

Each of the integrals of Eq (6) can be evaluated, $$\Phi_{\lambda_1}=a_1I_{1_i}(T)+a_2I_{2_i}(T)+a_3I_{3_i}(T) \text{ for } i=1 \text{ to } 3 \tag{7}$$

or can be rewritten in linear algebra form as $$\begin{bmatrix}\Phi_{\lambda_1}\\ \Phi_{\lambda_2}\\ \Phi_{\lambda_3}\end{bmatrix} = \begin{bmatrix} I_{1_1}(T) & I_{2_1}(T) & I_{3_1}(T)\\ I_{1_2}(T) & I_{2_2}(T) & I_{3_2}(T)\\ I_{1_3}(T) & I_{2_3}(T) & I_{3_3}(T)\end{bmatrix}\cdot\begin{bmatrix}a_1\\ a_2\\ a_3\end{bmatrix} \tag{8}$$

The solution for the unknown emissivity coefficients $a_1$, $a_2$ and $a_3$ is $$\begin{bmatrix}a_1\\ a_2\\ a_3\end{bmatrix}\cdot\begin{bmatrix} I_{1_1}(T) & I_{2_1}(T) & I_{3_1}(T)\\ I_{1_2}(T) & I_{2_2}(T) & I_{3_2}(T)\\ I_{1_3}(T) & I_{2_3}(T) & I_{3_3}(T)\end{bmatrix}^{-1}\cdot\begin{bmatrix}\Phi_{\lambda_1}\\ \Phi_{\lambda_2}\\ \Phi_{\lambda_3}\end{bmatrix} \tag{9}$$

Using Gaussian elimination, the coefficients can be determined and substituted into the fourth equation. If there is no error in Eq (9), the assumed temperature was correct, otherwise the temperature assumption needs to be changed and the coefficients recomputed.

The teachings of all references cited herein are hereby incorporated by reference herein.

The invention therefore provides an electronic streak camera having no moving parts for the accurate imaging of high-speed transient events. It is understood that modifications to the invention may be made as might occur to one with skill in the field of the invention, within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. An electronic streak camera, comprising:

(a) a housing;

(b) a first objective lens disposed along an optical axis within an opening in a wall of said housing for forming an image of optical radiation passing along said optical axis from an emissive body;

(c) a pinhole field stop disposed along said optical axis at the focal point of said objective lens;

(d) a second collimating lens disposed along said optical axis for collimating radiation passing said pinhole field stop;

(c) a prism for splitting said radiation from said collimating lens into a characteristic optical spectrum of said radiation; and (e) a third imaging lens for forming an image of said radiation from said prism;

(f) a detector array disposed at the focal plane of said third imaging lens for detecting said characteristic spectrum of said radiation.

2. The electronic streak camera of claim 1 wherein said detector array is a CCD array.

* * * * *